Feb. 9, 1926.
H. JUNGHANS ET AL
1,572,147
CIRCUIT CLOSER FOR DIRECTION INDICATORS
Filed March 17, 1924      2 Sheets-Sheet 1
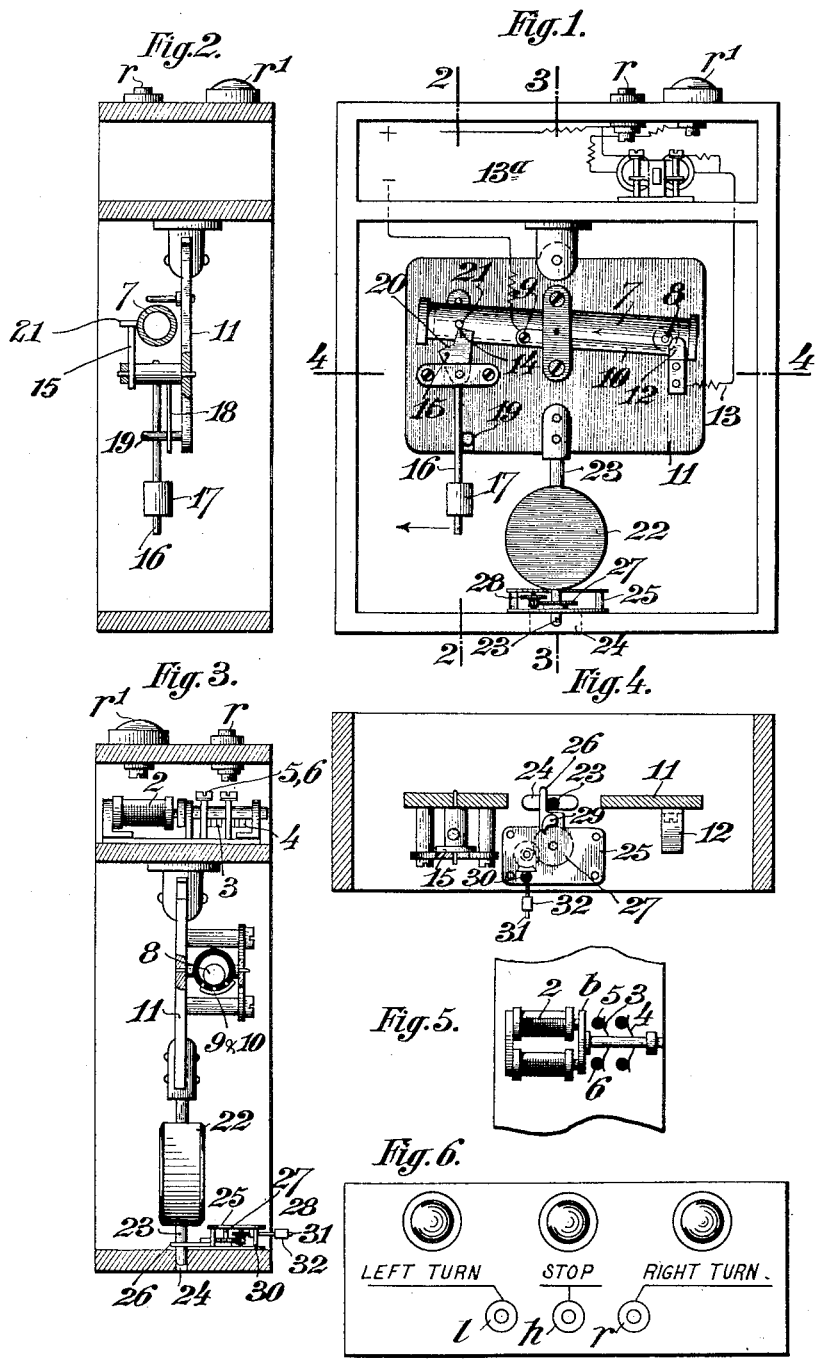
Inventors:
Helmut Junghans
and Fritz Glogauer
By [signature]
Attorney.

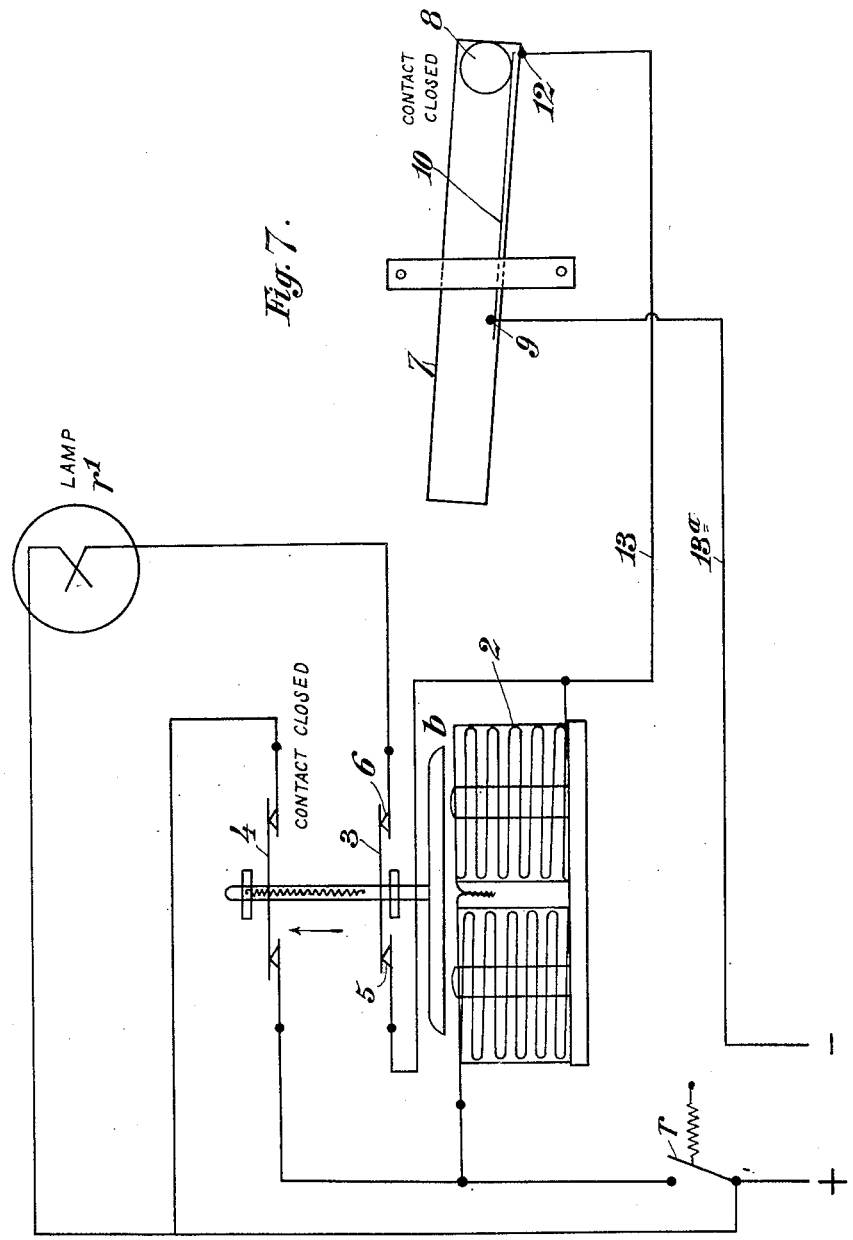

Patented Feb. 9, 1926.

1,572,147

UNITED STATES PATENT OFFICE.

HELMUT JUNGHANS, OF GUT BERNECK, NEAR SCHRAMBERG, GERMANY, AND FRITZ GLOGAUER, OF CINCINNATI, OHIO.

CIRCUIT CLOSER FOR DIRECTION INDICATORS.

Application filed March 17, 1924. Serial No. 699,813.

*To all whom it may concern:*

Be it known that (1) HELMUT JUNGHANS, a citizen of the German Republic, residing at Gut Berneck, near Schramberg, Germany, and (2) FRITZ GLOGAUER, a citizen of the United States of America, residing at No. 2201 Easthill Avenue, Cincinnati, Ohio, U. S. A., have invented certain new and useful Improvements in Circuit Closers for Direction Indicators, of which the following is a specification.

This invention relates to a circuit closer for a direction indicator for vehicles, especially motor vehicles such as motor cars, by means of which those in the vicinity are notified of intended changes in direction, namely turning to the right or left, and also that the vehicles are about to stop. In the known indicators of this kind, a great variety of mechanical and electrical means have been employed for the said purpose, these being placed in and out of action partly by hand and partly automatically, or else placed into operation by hand and thrown out of action automatically. The automatic control of the signals has hitherto been effected almost exclusively by means of the steering gear, which is an unfavourable method, since, on the one hand the steering gear—of a motor car for example—is such an important device that it ought not to be burdened with other arrangements, which might give rise to sources of failure, whilst on the other hand, on bad roads, the steering pillar and steering wheel of even the best and most up-to-date cars are continually subjected to powerful vibration, which may easily disarrange the control devices on the steering gear and thereby finally affect the steering gear itself.

Compared with the known means, the invention consists, generally, in that the swing of a pendulum, in negotiating a curve or in stopping, is employed to give the signals. This can be effected in various ways and in fact either so that the signal to be given is set on and off automatically, or else that the setting on is effected by hand and the setting off is automatic. The signals may be of any suitable kind.

The most suitable method of utilizing the oscillations of the pendulum for signalling with direction indicators is probably the electrical method, though mechanical methods are also practicable. In carrying the invention into practice, three pendulums are employed, two of which are so arranged that they swing out under the influence of centrifugal force when the vehicle is turning to the right or left, while the third pendulum is so mounted that it is caused to swing by the force of inertia.

The drawing illustrates an embodiment of the invention with electric signals, which is operated by hand and set out of action automatically. It is designed as a demonstration model, on which account the signals, pendulums and other parts are combined in a single apparatus. Of course, in the practical application of the device, the signals are preferably arranged in such a manner on the vehicle that they can be seen from the rear and also from the front, while the press buttons or switches for operating the signals are mounted near the driver's seat, for example on the dashboard or in any other suitable position.

Figures 1 to 6 represent an embodiment of the device, Figure 1 being an elevation, Figure 2 a section on line 2—2 of Figure 1; Figure 3 a section on line 3—3 of Figure 1, and Figure 4 a section on line 4—4 of Figure 1, while Figure 5 is a plan of the switch and magnet device and Figure 6 a view of the top of the apparatus, the buttons and signals being, as stated, mounted together on a plate. The arrangement shown in Figures 1 to 6 is designed for switching off a signal denoting that the vehicle is turning towards the right. A similar device for switching off the left-turn signal is mounted in inverse order, on the other side of the plate, while for the "stop" signal a device similar to the one illustrated is arranged so that the pendulum can swing in the direction of travel. Each device is set in operation by means of a separate press button, *l*, *r*, and *h*, each of which corresponds to a signal *l'*, *r'*, and *h'* ("left," "right," "stop").

Figure 7 shows the circuit arrangements for the apparatus constructed according to Figures 1 to 6.

The device according to Figures 1 to 6 responds to every movement of the vehicle and is therefore extremely sensitive, Switching mechanism according to Figure 1 with press-button switch, is provided for each change in the direction of movement, viz, turning to the right, turning to the left, and stopping, all of them, however, being of identical construction. The devices are mounted in the median line of the vehicle, and as far towards the rear as possible, the devices for indicating right turn and left turn being set up transversely to the direction of travel, and that for the stop signal in the direction of travel. In turning to the right and left, centrifugal force comes into action and the force of inertia in stopping. In the practical construction, the three devices are, of course, combined into one unit.

The device will be most easily understood from a short description of its mode of operation. Assuming that the driver intends to turn towards the right, he presses the spring-pressed button r, (Figure 6), which is mounted, along with the other spring-pressed buttons, by the driver's seat. At that instant, the coil 2, of a magnet receives current from a battery through conductors 13, and 13ª, and a contact 12, and 10, which is usually closed by a rolling ball 8, said magnet thereupon attracting an elastically mounted armature b (Figure 5). This causes the contact spring 3 to bear against the two poles 5 and 6 of the signal wire, thus completing the circuit r, 6, 3, 5, 13, 12, 10, 9, and 13ª for the luminous signal r' (transparent inscription or the like), while the contact spring 4 keeps the circuit with the magnet coil 2 and glow lamp r'—which has been broken by the automatic return of the press button r—closed, as can be seen from the wiring diagram Fig. 7. In the circuit, Figures 1 and 7, is interposed a tube 7, adapted to be pivoted on its centre and mounted on a bar 11 which can only move laterally under powerful vibration. In the case illustrated, this tube 7 houses the rolling steel ball 8, which is in contact with the inner wall of the tube and rolls on a contact strip 10, which is insulated from the tube and extends for a little more than half the length of the tube, and ordinarily bridging over the poles 9 and 12 (Figure 7). The arrangement is preferably such that a slot is provided in the under portion of the tube 7, the contact strip 10 being inserted loosely in said slot, so as to lie firmly against the tube, but preferably insulated therefrom. The ball might also be replaced by a suitably arranged mercury weight. The pole 12 is preferably formed as a flexible support for the corresponding end of the tube, and is connected with the magnet coils 2 by means of the conductor 13 (Figures 1 and 7). The return conductor 13ª is attached to the contact strip 10. The highest point 14 of a rotatable quadrant 15 serves as a support for the other end of the tube 7. The arrangement is so devised that the tube 7 takes up a slightly oblique position (about 5°).

On the pivotal point of the quadrant 15 is integrally mounted a pendulum 16 with a bob 17. By means of a lightly tensioned flat spring 18 (Figure 2) this pendulum is pressed against a stop pin 19, so that the pendulum 16 can only swing towards the one side (against the pressure of the spring and is thereby protected against oscillation).

If, after the signal has been set, the vehicle bears towards the right, the pendulum 16 swings towards the left, in the direction of the arrow in Figure 1, under the influence of centrifugal force, thus causing the quadrant 15, with its steep face 20, to swing in the opposite direction (see direction of arrow) and the apex 14 of the quadrant 15 to move from under the pin 21 of the tube 7, so that the latter can swing downward. Simultaneously with the outward swing of the pendulum under the influence of the centrifugal force, the ball 8 also begins to move under the action of centrifugal force, in the direction of the arrow according to Figure 1. In so doing it maintains the contact, and therefore keeps the signal in operation, by rolling along the contact strip 10, until it has travelled beyond the pivotal point of the tube and thereby causes the latter to tilt. The contact at 12 is then interrupted, thus cutting off the current through the magnet and lighting circuit and causing the elastic armature b and the contact springs 3 and 4 (Figure 5) to return to their initial position. When the influence of centrifugal force ceases, on the completion of the right hand turning movement of the vehicle, the pendulum 16 returns to its original position, to thus bring the suitably rounded or chamfered apex of the quadrant 15 back under the pin 21 of the tube 7, with the result that the tube 7 is moved back into its original position and held there. This causes the ball 8 to roll back into its original position, thus resetting the device over again.

If the driver desires to turn to the left, he presses the button 1 (Figure 6), whereupon—in the same manner as before—the circuit for the luminous signal l' is completed until, in this case also, automatic interruption is effected by the outward swing of the corresponding pendulum 16 and the tilting of the ball tube 7, when the vehicle traverses the curve. If the vehicle is to come to a standstill, the driver presses the button h, which switches on the light signal h', in the same manner as described before. After the vehicle stops, the pendulum of the corresponding device (which is mounted in the direction of travel) swings under the force of inertia and thus causes—in just the same way as before—the circuit 10, and 12 to be broken and consequently the signal to be automatically switched off.

In order to enable centrifugal force and the force of inertia to become fully effective, even at low speeds, it is necessary, by means of a known pendulum suspension, to maintain the entire automatic switching-off device, during the journey, in a vertical (or horizontal) position on the one hand, while on the other hand it must be mounted rigidly so that movement is permissible in certain directions, in each case, so as to render it insensitive to the manifold vibrations occurring during the journey.

The bar 11 of the device for indicating right and left turn in the direction of travel is therefore prevented from moving freely as regards its broad side, but is allowed freedom of movement transversely to the direction of travel, though only to the extent absolutely necessary for the lateral compensation of the camber of the road or any irregularities in the roadway. Conversely, the bar 11 for the "stop" signal is only allowed freedom of movement in the direction of travel, and not transversely thereto, in order that the vertical position of this switching device may be maintained in travelling up and down hill.

It is very important that the suspension of the devices should be arranged in such a manner as to be capable of adjustment both vertically and horizontally, which adjustment, however, must be effected by a somewhat checked, slow movement, so as to retard, for example, displacements of short duration caused by vibrations, and further that the whole mass of the device (which also acts as a pendulum) should not remain too sensitive to the momentarily occurring centrifugal force to the detriment of the parts intended to respond to centrifugal force. This latter result is attained by the provision of a restricting means, acting as a brake, which is so constructed that, when centrifugal force acts, it exercises a very powerful, or complete, check in the direction of pull of said force, thus producing the desired effect, namely that only such portions of the device as are intended to effect the centrifugal switching operation follow the movement of the centrifugal force, and not the whole mass of the device.

The braking device is constituted as follows:—

A heavy weight 22, attached to the bar 11 of the device, and having its pendulum rod 23 adapted to move in a guide 24 which permits of a sufficient swing in either direction, is coupled, by means of a pawl lever 26, to a horizontally mounted brake device 25 which, in each case, has a unilateral action. The brake (Figure 4) consists, in addition to the lever 26, of gear wheels 27, and 28, a spring pawl 29, an escapement and its shaft 30, and a rod 31 carrying an adjustable weight 32. When the weight 22 presses against the gear wheels 27, and 28, by means of the lever 26, the escapement 30 and weight 32 are caused to swing uniformly to and fro.

When centrifugal force comes into action, the weight 22 tends to swing in the corresponding direction, thus causing the escapement to be drawn in one direction and retained, pressing against the gear wheel, whereby a rigid counteraction, compelling cessation of movement, can be exerted on the entire brake 25. Since, however, as already mentioned, the pawl lever 26 can be arranged so as to brake in only one direction in each case, whereas the guide allows free movement in the other direction, it is necessary to provide the same braking arrangement as at 25 for the opposite side as well, by which means precisely the reliable action towards one side, in each case, is ensured. On the other hand, the escapement check can be replaced by a rotary-vane check, which affords the advantage that a single brake can act on both sides, as will be described later.

In the actual apparatus, the switching device for the right-turn signal is mounted on one side of the bar 11, and that for the left-turn signal on the other side of the bar 11, whilst the device for the "stop" signal is arranged at right angles thereto.

Having now particularly described and ascertained the nature of our said invention and in what manner the same is to be performed, we declare that what we claim is:—

1. A switch for direction indicators for vehicles comprising a tube pivotally mounted intermediate its ends; means in said tube for actuating an electric switch; and means for preventing movement of said tube; and when influenced by centrifugal force to free said tube and then to return it to its normal position.

2. A switch for direction indicators for vehicles comprising a tube pivotally mounted intermediate its ends; means in said tube for actuating an electric switch; and a pendulum for preventing movement of said tube, and when influenced by centrifugal force to free said tube and then to return it to its normal position.

3. A switch for direction indicators for vehicles comprising a tube pivotally mounted intermediate its ends; a ball in said tube for actuating an electric switch; and a pendulum for preventing movement of said tube, and when influenced by centrifugal force to free said tube and then to return it to its normal position.

4. A switch for direction indicators for vehicles comprising a switch mechanism pivotally mounted and an actuator for the switch; and means for preventing movement of said mechanism, and when influenced by centrifugal force to free said mechanism and then to return it to its normal position.

5. A switch for direction indicators for vehicles comprising a tube pivotally mounted intermediate its ends; a ball in said tube for actuating an electric switch; a pendulum for preventing movement of said tube, and when influenced by centrifugal force to free said tube and then to return it to its normal position; and means for restricting the tube and pendulum from the influences of the momentarily occurring centrifugal forces in a vehicle.

6. A switch for direction indicators for vehicles comprising a switch mechanism pivotally mounted; means for preventing movement of said mechanism, and when influenced by centrifugal force to free said mechanism and then to return it to its normal position; and means for restricting said mechanism from the influences of the momentarily occurring centrifugal forces in a vehicle.

7. A switch for direction indicators for vehicles comprising a switch mechanism pivotally mounted; means for preventing movement of said mechanism, and when influenced by centrifugal force to free said mechanism and then to return it to its normal position; and a brake device for restricting said mechanism from the influences of the momentarily occurring centrifugal forces in a vehicle.

8. A switch for direction indicators for vehicles comprising a pivotally mounted bar; a tube pivotally mounted intermediate its ends to said bar; means in said tube for actuating an electric switch; means for preventing movement of said tube, and when influenced by centrifugal force to free said tube and then return it to its normal position; a pendulum secured to said bar; and means associated with said pendulum for restricting the bar from the influences of the momentarily occurring centrifugal forces in the vehicle.

9. A switch for direction indicators for vehicles comprising a pivotally mounted bar; a tube pivotally mounted intermediate its ends to said bar; means in said tube for actuating an electric switch; a pendulum pivotally mounted on said bar adapted to prevent movement of said tube, and when influenced by centrifugal force to free said tube and then return it to its normal position; a second pendulum secured to said bar; and means associated with said last-named pendulum for restricting the bar from the influences of the momentarily occurring centrifugal forces in the vehicle.

10. A switch for direction indicators for vehicles comprising a pivotally mounted bar; a tube pivotally mounted intermediate its ends to said bar; means in said tube for actuating an electric switch; a pendulum pivotally mounted on said bar adapted to prevent movement of said tube, and when influenced by centrifugal force to free said tube and then return it to its normal position; a second pendulum secured to said bar; and a brake device associated with said last-named pendulum for restricting the bar from the influences of the momentarily occurring centrifugal forces in the vehicle.

11. A switch for direction indicators for vehicles comprising a tube pivotally mounted intermediate its ends; means in said tube for actuating an electric switch; a quadrant pivotally mounted and adapted to prevent movement of said tube; and a pendulum secured to the quadrant adapted when influenced by centrifugal force to move the quadrant to free the tube and then return it to its normal position.

12. A switch for direction indicators for vehicles comprising a switch pivotally mounted and including means for actuating the switch; a quadrant pivotally mounted and adapted to prevent movement of said switch; and a pendulum secured to the quadrant adapted when influenced by centrifugal force to move the quadrant to free the switch and then return it to its normal position.

In testimony whereof we affix our signatures.

HELMUT JUNGHANS.
FRITZ GLOGAUER.